June 28, 1949.
F. M. POOLE
2,474,802
GAUGE FOR EXTERNAL MEASUREMENTS
OF CYLINDRICAL BODIES
Filed July 18, 1946
2 Sheets-Sheet 1
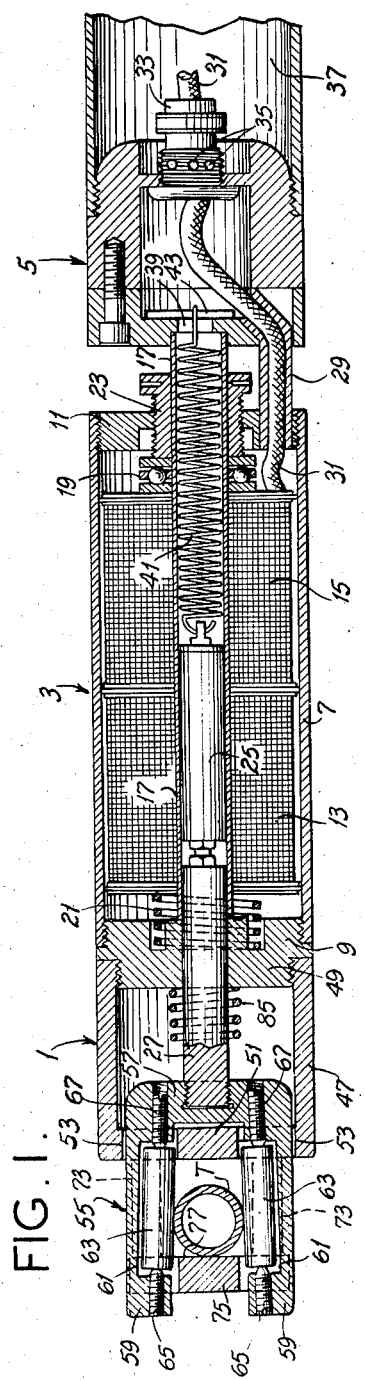
FIG. 2.
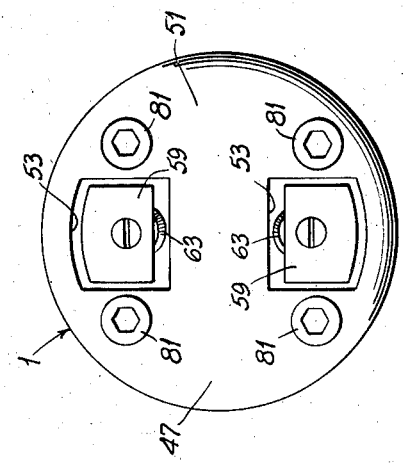
FIG. 3.
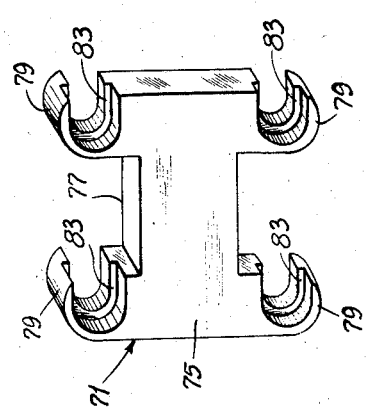
Foster M. Poole,
Inventor
Haynes and Koenig
Attorneys June 28, 1949. F. M. POOLE 2,474,802
GAUGE FOR EXTERNAL MEASUREMENTS
OF CYLINDRICAL BODIES
Filed July 18, 1946 2 Sheets-Sheet 2
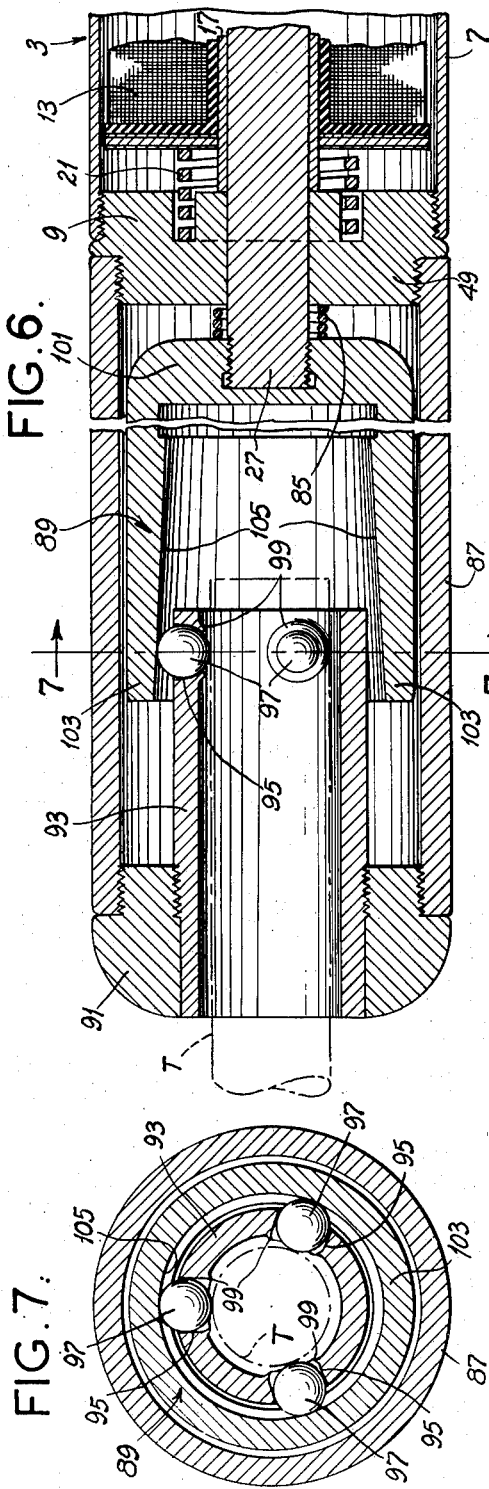
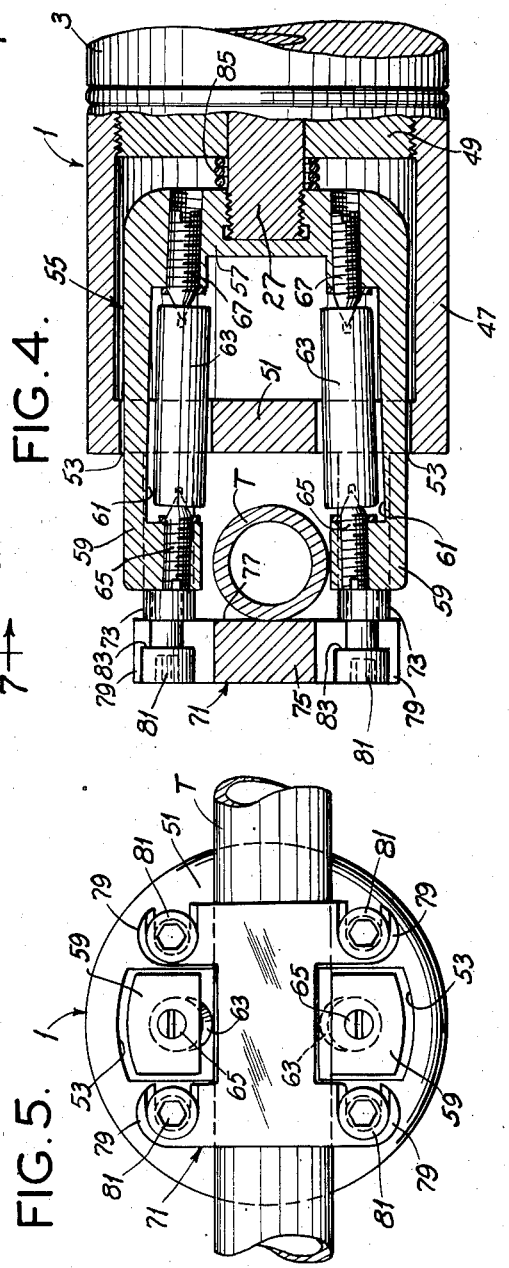
Foster M. Poole,
Inventor.
Haynes and Koenig
Attorneys Patented June 28, 1949

2,474,802

UNITED STATES PATENT OFFICE 2,474,802

GAUGE FOR EXTERNAL MEASUREMENTS OF CYLINDRICAL BODIES

Foster M. Poole, Dallas, Tex.

Application July 18, 1946, Serial No. 684,556

4 Claims. (Cl. 33—178)

This invention relates to measuring instruments or gages and, more particularly, to external calipers for making outside diameter measurements of cylindrical bodies.

Among the several objects of the invention may be noted the provision of an external caliper instrument for quickly and accurately determining the outside diameter of cylindrical bodies; the provision of instruments of this class which are adapted to measure the outside diameters of cylindrical bodies either at the ends or intermediate parts thereof; the provision of such instruments wherein a feeler gage is automatically moved into engagement with the body being measured with a predetermined pressure so as to avoid the necessity for any critical human judgment; and the provision of instruments of this class which are simple and reliable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a longitudinal section through one form of the measuring instrument;

Fig. 2 is an end view of the caliper head of Fig. 1 with an anvil removed;

Fig. 3 is an oblique view of the anvil;

Fig. 4 is an enlarged longitudinal section through the caliper head of Fig. 1, illustrating a feeler gage in retracted position;

Fig. 5 is an end view of the caliper head of Fig. 4;

Fig. 6 is a longitudinal section through a second form of caliper head for measuring end diameters only, diagrammatically illustrating a cylindrical body in said head; and, Fig. 7 is a transverse section taken on line 7—7 of Fig. 6.

Similar reference characters indicate corresponding parts throughout the several views of the drawings.

This invention involves an improvement over the measuring transmitter instruments disclosed in my prior Patent 2,348,643 and in my copending application Serial No. 649,650, filed February 23, 1946. The measuring instruments disclosed therein are internal tube calipers for measuring inside dimensions of cylinders or the like. Generally they include a transmitter unit having a first pair of coils in an impedance bridge circuit. This transmitter unit has a gaging device mounted in the transmitter unit which in response to various dimensions moves an armature in respect to said first pair of coils. The impedance bridge circuit includes a second pair of coils cooperative with an armature core connected to drive an indicator. Movement by the transmitter device of the armature associated with the first coils unbalances the initially balanced impedance bridge circuit which, through the second coils, moves the associated armature and consequently moves the indicator. This continues until the impedance bridge circuit is again balanced. Thus the indicator indicates the dimensions traversed by the transmitter unit. Full details appear in said patent. This invention involves an improvement in the feeler gage device to adapt the aforementioned measuring instruments to measure external or outside diameters.

Referring now more particularly to Fig. 1, a transmitter unit is shown in its entirety. This unit includes a caliper head 1, a coil housing 3 and a manifold 5. The coil housing 3 corresponds to the coil housing disclosed in the above-mentioned patent and copending application. It includes a cylindrical container 7 having closure heads 9 and 11 in opposite ends thereof. Within this container are transmitter coils 13 and 15 connected in a bridge circuit such as described in said patent. These coils are slidably mounted on a guide cylinder 17 and are biased by a spring 21 against an end thrust bearing 19. The thrust bearing is supported by an adjustable bushing 23 threaded through head 11. The cylinder 17, which is formed of non-magnetic material such as bearing bronze, extends from head 9 through container 3 and through the bushing 23. Slidably disposed in the cylinder 17 is a magnetic armature 25 which is connected to a plunger rod 27 sliding in the head 9 and extending outward therefrom. This plunger rod has an air seal in the cylinder.

The container 7 is connected in spaced relation to the manifold 5 by a number of spacing posts 29, only one of these posts being shown in Fig. 1. This post 29 is hollow to provide a passage for the cable 31 carrying the lead wires of coils 13 and 15. This cable passes outward from the manifold through a bushing 33 threaded in one end of the manifold. The manifold is supplied with compressed air through apertures 35 in bushing 33 from a hollow body 37 in which the manifold is threaded. The air supply to this body is under the control of a suitable valve (not shown) adapted alternately to connect the body to a source of compressed air or to cut it off from said source and vent it to exhaust. The end of the cylinder 17 extending from head 11 is seated in air-tight relation in a counterbore in the end of the manifold in communication with bore 39 therein. Compressed air from the manifold enters cylinder 17 and biases armature 25 and plunger rod 27 outward (to the left as viewed in Fig. 1). This outward bias is resisted by a tension spring 41 connected between the armature 25 and a pin 43 in the manifold. Spring 41 biases the armature and rod inward to the retracted position indicated in Fig. 4, when the pressure in the manifold is released. The above-described elements, generally, are counterparts of corresponding elements disclosed in my prior Patent 2,348,643 and my copending application Serial No. 649,650. The present invention involves a change in the inside caliper feeler gages disclosed therein. It provides an outside caliper feeler gage, which is adapted to measure the outside diameter of a work piece such as a tube or the like, indexed T.

In the form of the invention illustrated in Figs. 1 to 5, the caliper head 1 comprises a cap 47 threaded on a boss 49 on the closure head 9. The end wall of the cap 51 has a pair of diametrically opposed apertures 53 therein. An external caliper feeler gage, generally designated 55, is threaded on the outer end of rod 27. This gage comprises a base portion 57 within the cap having a pair of diametrically opposed arms 59 extending forward therefrom and passing loosely through the apertures 53. The gage is movable in the cap. The arms 59 are recessed, as indicated at 61. Cylindrical rollers 63 are journalled in the recesses on adjustable pivot bearings 65 and 67. Bearings 65 are threaded through the outer ends of the arms and bearings 67 are threaded through the base portion 57. These bearings are so disposed that the axes of rollers 63 diverge outward from the base 57 and so that the rollers project from recesses 61. The rollers 63 are preferably formed of hardened steel with a highly polished and accurately finished surface. A removable anvil 71 is supported on the end wall 51 of cap 47 in accurately spaced relation with respect thereto by means of spacing posts 73. The anvil comprises a hardened steel block 75 having an accurately finished inside surface 77. Notched lugs 79 project from the block. These lugs engage headed screws 81, threaded into the spacing posts 73. The lugs are countersunk, as indicated at 83, to receive the heads of the screws.

Operation of this form of the invention is as follows:

It is assumed that the coils 13 and 15 have been adjusted within the coil housing 3 in reference to the position of the armature 25 upon the measurement of a standard tube T having a given predetermined external diameter (1.000 inch for example) so that the bridge circuit including these coils may be balanced. This adjustment is made by adjusting the bushing 23 to vary the position of the coils relative to the armature until the circuit is balanced, as indicated by a reading of 1.000 inch on the bridge indicator (not shown). The bridge circuit and indicator do not form a part of this invention.

In the procedure for measuring the external diameter of a work piece such as a tube T, the manifold 5 is vented to exhaust. Spring 41 thereupon retracts armature 25, rod 27 and the gage 55 to the right (as viewed in Figs. 1 and 4) to the position shown in Fig. 4. A bumper spring 85 may be provided around rod 27 between boss 49 and the gage base 57 to cushion the action upon retraction. A tube T or the like, whose outside diameter is to be measured, is inserted between the outer ends of the gage arms 59 and held against the surface 77 of the anvil 71. Compressed air is then supplied to the manifold at pressure sufficient to overcome the bias of spring 41. This pressure moves plunger rod 27 and gage 55 outward (to the left as viewed in Fig. 4) until the tube is engaged between the divergent cylindrical rollers 63 of the gage and against the surface 77 of the anvil (Fig. 1).

The amount which the gage moves outward is dependent upon the diameter of the tube in the plane wherein it is engaged by the rollers. For various diameters the gage moves outward varying distances from its initial position. Consequently, the position of armature 25 relative to coils 13 and 15 differs in accordance with different diameters of tubes being measured. For a particular position of the armature with respect to coils 13 and 15, as determined by the diameter of the tube being measured, the coils have a particular inductance. This inductance is, in effect, measured by the bridge circuit in which the coils are connected and indicated by the bridge indicator as a measure of the external diameter of the tube T.

When a tube T having a diameter of 1.000 inch is measured the gage moves outward to a position wherein the armature 25 is positioned to balance the bridge circuit, and the indicator reads 1.000 inch. If the diameter being measured is 1.005 inches, for example, the gage moves outward a lesser distance and armature 25 is positioned to the right (as viewed in Fig. 1) of the position it assumes in the above case. This results in an unbalance of the bridge circuit in one direction and a corresponding reading on its indicator of 1.005 inches. If the diameter being measured is 0.995 inch, the gage moves outward farther than it does in the case of a 1.000 inch diameter. The position of the armature 25 is then such as to unbalance the bridge circuit in the other direction and to effect a reading on the indicator of 0.995 inch.

Thus, the measuring instrument of Figs. 1 to 5 may be simply and reliably employed to make accurate external diameter measurements. The tube T may be inserted for any desired distance between the arms 59 and, consequently, may be measured at the ends or at any intermediate section thereof. The pressure of the gage upon the tube being measured is a function of the air pressure in the manifold which is of such predetermined value to effect only a proper engagement of the tube without appreciably deforming either the gage or the tube. Hence, no critical human judgment is involved in obtaining the proper pressure between the gage and the tube being measured.

The opposed divergent surfaces of rollers 63 engage the opposite sides of the tube theoretically with point contact at the points of tangency of the rollers and tubes. Practically, there is an area of contact between the rollers and tube. The rollers rotate and avoid the constant application of the same points thereon to the tubes to avoid wear of the rollers. They also permit lateral movements of the device on the tubes. The gage 55 is, in effect, moved outward into engagement with the work piece being measured by a fluid motor device comprising plunger rod 27, cylinder 17 and the manifold 5. The anvil cooperates with the work piece to limit outward movement of the gage in accordance with the diameter of the work piece being measured.

Figs. 6 and 7 illustrate a second form of the invention which includes a caliper head for measuring end diameters only. In this form the cap 47 of Fig. 1 is replaced by a cap 87 which is threaded on the boss 49, and the gage 55 of Fig. 1 is replaced by a gage 89 threaded on the outer end of rod 27. In all other respects, this form is the same as that of Fig. 1.

The cap 87 has a centrally apertured plug 91 threaded into the outer end thereof. A tube or sleeve 93 is threaded into the aperture in the plug and extends into the cap 87. It is open at both ends. The tube 93 has apertures 95 therein at its inner end, these apertures being spaced at approximately 120° intervals. Hardened steel feeler balls 97 are confined within the apertures for rolling movement therein and for radial movement with respect to the tube 93. These balls are prevented from dropping into the tube 93 by lips 99 at the inner ends of the apertures. They are prevented from moving outward by the gage 89.

The gage 89 is a cone generally cup-shaped and has a base portion 101 and a wall 103. The wall 103 has an internal conical surface 105 diverging outward (to the left as viewed in Fig. 6) from the base portion 101. Thus the inner opening of the sleeve 93 is directed toward the small end of the cone 105. The gage is slidable in the cap 87. The wall 103 surrounds the balls 97 in all positions of the gage within the cap to prevent the balls from escaping from the apertures 95. The gage is preferably formed of hardened steel and its internal conical surface is highly polished and accurately finished.

Operation of this form is as follows:

The measuring instrument is calibrated in the same manner as described above in connection with Fig. 1. The gage 89 is retracted to an innermost retracted position by venting the manifold 5 to the exhaust. The end of a work piece, such as a tube T, is then inserted into the coaxial sleeve 93 to a position wherein it is disposed within balls 97. It may extend from the inner opening of the sleeve 93 without setting up an endwise reaction with either of the coaxially movable members 93 or 89. Compressed air is then supplied to the manifold to move the gage 89 outward (to the left as viewed in Fig. 6). The gage moves outward until the balls 97 are wedged between the opposed outwardly diverging surface portions of the internal conical surface 105 and the surface of the work piece. The distance the gage moves outward is dependent upon the diameter of the work piece in the plane wherein it is engaged by the balls. As in the Fig. 1 form, the position of the gage, as determined by the diameter of the work piece, is indicated by the indicator of the bridge circuit as a measure of the diameter.

The balls 97 are adapted to roll to various positions upon retraction of a work piece so as to prevent repeated application of the gage and work pieces at particular points thereof. Their direction of rotation upon such retraction is such as to exert a declutching, rather than a clutching action relative to the cone. Thus a continuous reading may be obtained without binding. Thus, undue wear at particular points on the balls is avoided. The balls cooperate with the work piece to limit outward movement of the gage in accordance with the diameter of the work piece being measured.

As illustrated herein, the housing 3 is generally held stationary and functions as a support for the gage during movement of the latter. It will be understood, however, that the gage may be held stationary and that the housing 3 may be movable. In either case, the housing 3 with coils 13 and 15 therein functions as a reference member and support with respect to the gage since the position of the gage with reference thereto is a function of the diameter of the work piece. It will also be understood that any suitable indicating means for indicating diameters other than the electrical means herein described may be employed. Such indicating means may be of any type suitable for giving amplified indications of variations in the position of the gage relative to the housing 3 in accordance with variations in the diameter of work pieces being measured.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A measuring instrument comprising a housing, a guide in said housing, a rod slidable in said guide extending from one end of said housing, a cap detachably connected to said end of said housing, said cap having a centrally apertured end wall, a tube coaxial with the aperture in said end wall extending into said cap, said tube terminating short of said housing and having a plurality of apertures in the end thereof within said cap, feeler balls radially movable in said apertures, means for preventing said balls from dropping into said tube, and a gage detachably connected to the end of said rod within said cap, said gage comprising a hollow body having an outwardly diverging internal conical surface, said surface surrounding said balls and confining said balls in said apertures.

2. A measuring instrument comprising a housing, a cylinder in said housing, a plunger slidable in said cylinder and extending from one end of said housing, a cap detachably connected to said end of the housing, said cap having a centrally apertured end wall, a tube coaxial with the aperture in said end wall extending into said cap, said tube terminating short of said housing and having a plurality of apertures in the end thereof within said cap, feeler balls radially movable in said apertures, means for preventing said balls from dropping into said tube, a gage detachably connected to the end of said plunger within said cap, said gage comprising a hollow body having an outwardly diverging internal conical surface, said surface surrounding said balls and confining said balls in said apertures, means for supplying pressure fluid to said cylinder to move said plunger and gage outward from the housing, and means in said housing responsive to variations in the position of said gage for actuating an indicator.

3. In a measuring instrument of the class described, a gage member consisting of an inside cone, a coaxial sleeve extending into said cone, said sleeve having an open end directed into the cone toward its smaller end and radial openings directed outward toward the wall of the cone, balls in said openings, a mechanism self-contained in the instrument connecting the gage member and the sleeve for coaxial movement and including a cylinder and piston providing an expansible chamber for an expanding medium, the gage being movable upon expansion of said chamber by said medium in a direction to move the small end of the cone toward said open end of the sleeve to push the balls inward with respect to the sleeve.

4. In a measuring instrument of the class described, a gage member consisting of an inside cone, a coaxial sleeve extending into said cone, said sleeve having an open end directed into the cone toward its smaller end and radial openings directed outward toward the cone, balls in said openings, a mechanism self-contained in the instrument connecting the gage member and the sleeve for coaxial movement and including a resilient motivating medium, the gage being movable upon resilient action of said medium in a direction to move the small end of the cone toward said open end of the sleeve to push the balls inward with respect to the sleeve.

FOSTER M. POOLE.

REFERENCES CITED

The following references are of record in the file of this patent:

UNITED STATES PATENTS

| Number | Name | Date |
|---|---|---|
| 1,008,842 | Mair | Nov. 14, 1911 |
| 1,553,961 | Pryce | Sept. 15, 1925 |
| 2,235,533 | Roberts | Mar. 18, 1941 |
| 2,340,987 | Robidoux | Feb. 8, 1944 |
| 2,348,643 | Poole | May 9, 1944 |
| 2,392,357 | Bays | Jan. 8, 1946 |
| 2,398,562 | Russell | Apr. 16, 1946 |